United States Patent [19]
Burr et al.

[11] 4,217,788
[45] Aug. 19, 1980

[54] GEAR REDUCER

[75] Inventors: John K. Burr; William Wolf, both of Shrewsbury, N.J.

[73] Assignee: Motion Systems Corporation, Shrewsbury, N.J.

[21] Appl. No.: 924,214

[22] Filed: Jul. 12, 1978

[51] Int. Cl.² ............................................. F16H 1/16
[52] U.S. Cl. ................................................... 74/425
[58] Field of Search ........................................ 74/425

[56]  References Cited
U.S. PATENT DOCUMENTS

| 2,657,591 | 11/1953 | Kaelin | 74/425 X |
| 4,020,715 | 5/1977 | Sollars | 74/425 X |
| 4,026,163 | 5/1977 | Merkert | 74/425 |

*Primary Examiner*—Louis Rimrodt

[57] ABSTRACT

A gear reducer which is resistant to axial and radial loads on both the input and output shafts. The reducer comprises a housing, a worm and a worm gear.

6 Claims, 3 Drawing Figures

GEAR REDUCER

BACKGROUND OF THE INVENTION (a) Field of the Invention

Broadly speaking, this invention relates to a gear reducer. More particularly, in a preferred embodiment, this invention relates to a gear reducer which is reliable in operation, relatively inexpensive to fabricate and which is resistant to axial and radial loads on the input and output shafts.

(b) Discussion of the Prior Art

Many engineering applications require a gear reducer which can be coupled to a variety of motors and accommodate a number of different output shafts. Such a gear reducer should be capable of pounding several different gear reductions, e.g. 10:1, 20:1, 40:1 et cetera.

Unfortunately, in the prior art, such devices were difficult and expensive to manufacture and subject to excessive wear and failure due to the inability of the input and output shafts to resist axial and radial loading.

SUMMARY OF THE INVENTION

As a solution to these and other problems, the instant invention is a worm and worm gear reducer having a housing which may advantageously be machined in a single operation, thus increasing accuracy. The housing includes means for inhibiting radial and axial play on both the input and output shafts.

The invention and its mode of operation will be more fully understood from the following detailed description when taken with the appended drawing in which:

DETAILED DESCRIPTION OF THE INVENTION

Figure 1:
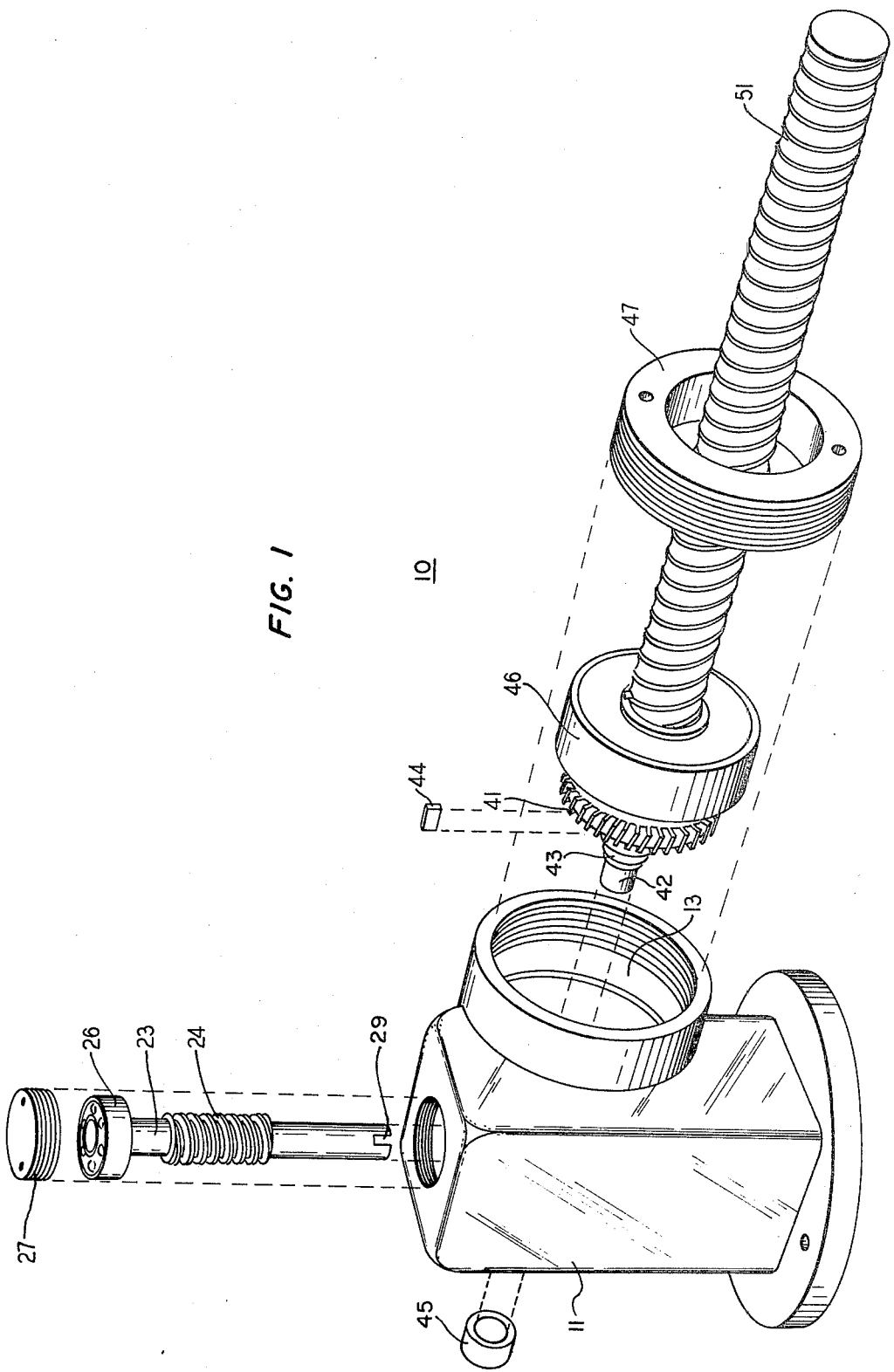
FIGS. 1 and 2 are respectively an "exploded" and integral views of an illustrative gear reducer according to the invention.
Figure 2:
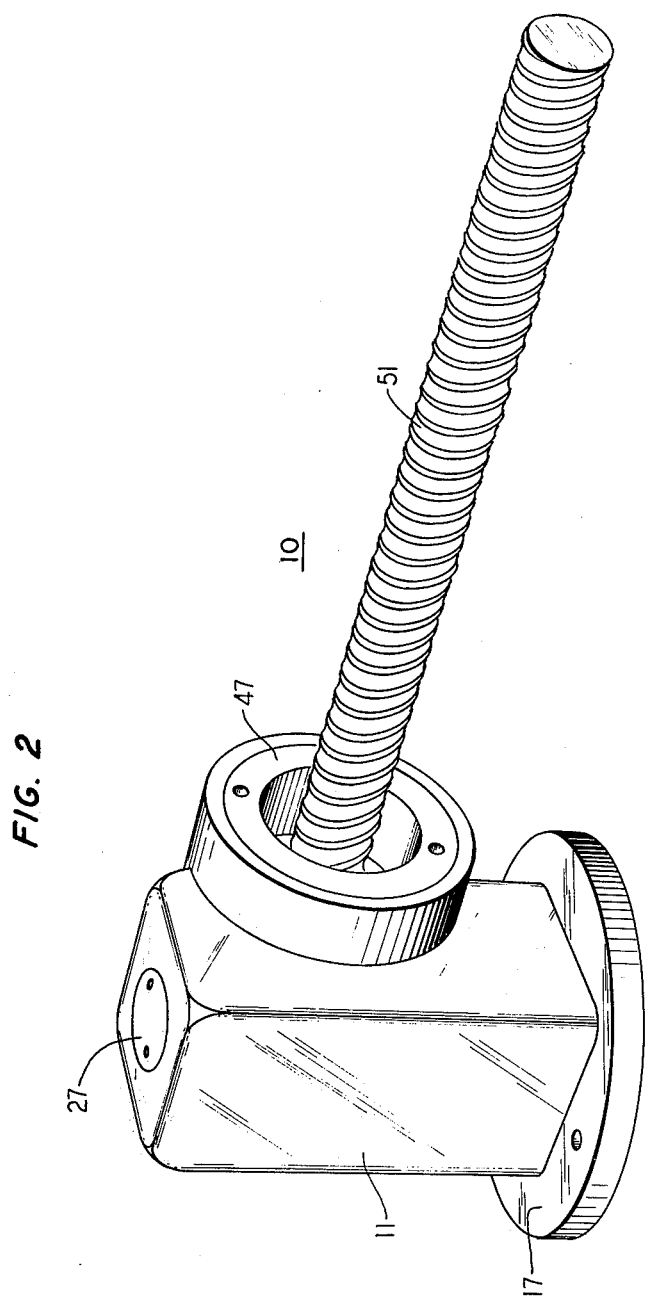

As shown in FIGS. 1 and 2, gear reducer 10 comprises a housing 11, advantageously of cast aluminum, having a first and second orthogonally-oriented cylindrical bores 12 and 13 formed therein. Housing 11 also includes a square recess 16 and a flange 17 co-axial with cylindrical bore 12.

Figure 3:
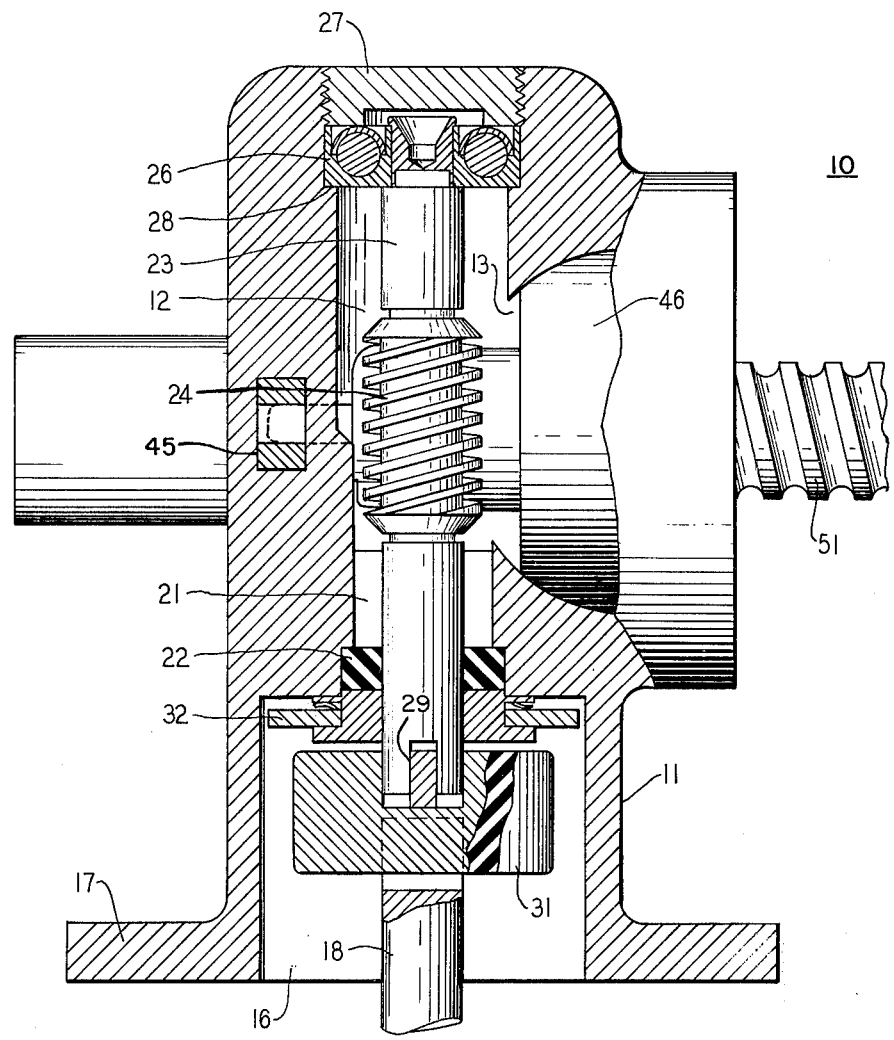
FIG. 3 is a cross-section of the reducer shown in FIGS. 1 and 2.

Flange 17, which may be considered the input side of the gear reducer, mounts an electric motor 18. As best seen in FIG. 3, a sintered bronze sleeve bearing 21 is positioned between bore 12 and recess 16. A seal 22 abuts the bearing 21 to prevent any excess lubricant from leaking into the recess 16.

The bearing 21 receives one end of a shaft 23 which carries the gear reducer worm 24 at the middle thereof. The other end of shaft 23 carries a ball bearing 26 which is secured thereto, for example, by staking the worm shaft 23 to the inner race of the ball bearing. Shaft 23 and, hence, worm 24 and ball bearing 26 are retained within bore 12 by a threaded, cylindrical retainer 27 which bears against the outer race of ball bearing 26 and holds it against a shoulder 28 machined into housing 11. The end of shaft 23 which passes through bearing 21 and seal 22 into square recess 16 has a slot 29 therein which engages a steel segment in a rubber-coupling 31. A second steel segment in coupling 31, orthogonal to the first, engages a similar slot in the shaft of motor 18. This coupling arrangement compensates for whatever mis-alignment may exist between the motor shaft and the worm shaft and also insulates the worm shaft from any shock loads which might otherwise be transmitted between the motor shaft and the worm shaft.

A friction brake 32 is positioned on shaft 23 intermediate seal 22 and coupling 31. Brake 32 is a spring-loaded sandwich having two fiber washers to provide drag and is keyed to the slot on shaft 23. Rotation of the fixed portion of the brake is prevented by its square shape which fits closely in the square recess 16. Brake 32 is typically provided in several strengths to overcome the different back-driving forces inherent in worm sets of different reductions.

The manner in which shaft 23 and worm 24 are fastened within housing 11 is significant as bearing 21 and, more importantly, ball bearing 26 together take up both axial and radial loads on the worm. Worm 24 engages a worm gear 41 which is mounted to an output shaft 42. Worm gear 41 is retained on shaft 42 by a threaded nut 43 and rotation on the shaft is prevented by the use of a key 44. The far end of shaft 42 is supported in a sleeve bearing 45 which is pressed into the far end of bore 13 in housing 11. A second, sealed, ball bearing 46 is mounted about shaft 42 with the inner race secured thereto. The outer race of ball bearing 46 engages a shoulder in the cylindrical bore 13, in the same manner as ball bearing 26 is received in bore 12, and output shaft 42 is retained in the housing by a second threaded cylindrical retainer 47 which bears against the outer race of ball bearing 46. Again, sleeve bearing 43 and ball bearing 46 act to take up both axial and radical loads on shaft 42.

The other end 51 of shaft 42 is threaded to receive a linear actuator (not shown) and the threading may comprise either a ball screw or an acme screw. Further, retainer 47 may be extended or internally threaded, to provide mounting for shaft cover tubes, if desired. The extended retainer can also be used as a mounting point for the reducer either by attachment to a plate or by the addition of trunions.

An important aspect of this invention is the fact that the two bores in casting 11 can each be machined at one time from one side and, thus, provide good concentricity for the output shaft bearings, which ensures smooth, long-lived operation.

One skilled in the art may make various changes and substitutions to the layout of parts shown without departing from the spirit and scope of the invention.

What I claim is:

1. A gear reducer which comprises:
   a housing having first and second substantially orthogonal cylindrical bores formed therein;
   a shaft carrying a worm positioned in said first cylindrical bore;
   a shaft carrying a worm gear positioned in said second cylindrical bore, said worm and worm gear engaging to provide said reduction;
   means, associated with said first bore, for inhibiting simultaneously axial and radial displacement of said worm-carrying shaft; and
   means, associated with said second bore, for inhibiting simultaneously axial and radial displacement of said worm gear carrying shaft.

2. The gear reducer according to claim 1 wherein said first bore displacement inhibiting means includes a sleeve bearing at one end of the bore through which said worm-carrying shaft passes and a stepped shoulder at the other end of the bore, said gear reducer further comprising:
- a first ball bearing positioned about said worm-carrying shaft, the inner race thereof being secured to said shaft to rotate therewith; and
- first retaining means for pressing the outer race of said ball bearing into engagement with said stepped shoulder.

3. The apparatus according to claim 2 further including a motor mounted to said housing, the shaft of said motor aligning with said worm-carrying shaft downstream of said sleeve bearing; and
- resilient coupling means for coupling the shaft of said motor to said worm-carrying shaft.

4. The apparatus according to claim 3 wherein said housing includes a square recess between said motor and said sleeve bearing and the apparatus further comprises:
- a friction brake mounted to said worm-carrying shaft upstream of said resilient coupling means, said friction brake including a first portion having a square shape for mating engagement with said square recess.

5. The gear reducer according to claim 1 wherein said second bore displacement inhibiting means includes a blind sleeve bearing in said bore for receiving the extreme end of said worm gear carrying shaft and a stepped shoulder at the other end of said bore, said gear reducer further comprising:
- a second ball bearing positioned about said worm gear carrying shaft, the inner race thereof being secured to said shaft to rotate therewith; and
- second retaining means for pressing the outer race of said ball bearing against said stepped shoulder.

6. The apparatus according to claim 5 wherein said second retaining means is apertured; that portion of said worm gear carrying shaft which passes through said aperture is threaded, and said apparatus further comprises a linear actuator mounted about said shaft.

* * * * *